United States Patent
Sharman et al.

(10) Patent No.: US 9,605,328 B2
(45) Date of Patent: Mar. 28, 2017

(54) SURFACE CONTOURING OF A WELD CAP AND ADJACENT BASE METAL USING ULTRASONIC IMPACT TREATMENT

(75) Inventors: David John Sharman, Plant City, FL (US); Samuel B. Abston, II, Alabaster, AL (US); Taylor Hanes, Mountain Brook, AL (US)

(73) Assignee: Progress Rail Services Corporation, Albertville, AL (US)

( * ) Notice: Subject to any disclaimer, the term of this patent is extended or adjusted under 35 U.S.C. 154(b) by 174 days.

(21) Appl. No.: 14/235,530

(22) PCT Filed: Jul. 30, 2012

(86) PCT No.: PCT/US2012/048658
§ 371 (c)(1),
(2), (4) Date: Jan. 28, 2014

(87) PCT Pub. No.: WO2013/019732
PCT Pub. Date: Feb. 7, 2013

(65) Prior Publication Data
US 2014/0169863 A1    Jun. 19, 2014

Related U.S. Application Data

(60) Provisional application No. 61/513,103, filed on Jul. 29, 2011.

(51) Int. Cl.
*B25G 3/34* (2006.01)
*F16B 11/00* (2006.01)
(Continued)

(52) U.S. Cl.
CPC .............. *C21D 7/06* (2013.01); *B23K 9/02* (2013.01); *B23K 33/00* (2013.01); *C21D 9/50* (2013.01);
(Continued)

(58) Field of Classification Search
CPC .......... Y10T 403/478; Y10T 29/49737; Y10T 29/49742; Y10T 29/49746; B23K 33/00;
(Continued)

(56) References Cited

U.S. PATENT DOCUMENTS 3,313,146 A * 4/1967 Krautkramer ...... G01N 29/0636
346/33 F
3,514,130 A * 5/1970 Milleville ............. F16K 27/102
228/169

(Continued)

*Primary Examiner* — Gregory Binda
*Assistant Examiner* — Nahid Amiri
(74) *Attorney, Agent, or Firm* — Hibshman Claim Construction PLLC (57) ABSTRACT

A method for forming a smooth interface between a weld cap and an adjacent base metal utilizing ultrasonic impact treatment. The method improves the geometric profile of a weld while imparting a compressive residual stress layer on the weld metal and base metal thereby alleviating the tensile residual stresses imparted to the metals during welding. The contouring process does not remove material, as in grinding, but plastically deforms the surface being treated producing a densified surface, in turn providing a smooth weld cap and base metal surface finish without the loss of base or weld metal thickness.

19 Claims, 6 Drawing Sheets

(51) Int. Cl.
*F16B 12/04* (2006.01)
*F16L 13/00* (2006.01)
*C21D 7/06* (2006.01)
*C21D 10/00* (2006.01)
*C22F 3/00* (2006.01)
*B23K 9/02* (2006.01)
*B23K 33/00* (2006.01)
*C21D 9/50* (2006.01)

(52) U.S. Cl.
CPC ............... *C21D 10/00* (2013.01); *C22F 3/00* (2013.01); *C21D 2251/04* (2013.01); *Y10T 403/478* (2015.01)

(58) Field of Classification Search
CPC . B23K 9/02; B23K 20/10; C21D 7/00; C21D 7/06; C21D 10/00; C21D 9/50; C21D 2251/04; C22F 3/00
USPC .................. 403/270–272; 228/1.1, 110.1
See application file for complete search history.

(56) References Cited

U.S. PATENT DOCUMENTS

| | | | | |
|---|---|---|---|---|
| 3,685,348 A | * | 8/1972 | Bottcher | G01N 29/221 73/628 |
| 4,049,186 A | * | 9/1977 | Hanneman | B23K 9/0216 219/137 WM |
| 4,129,062 A | * | 12/1978 | Bergmann | B23D 79/021 409/140 |
| 4,624,402 A | * | 11/1986 | Pitcairn | B23K 9/048 228/119 |
| 6,171,415 B1 | | 1/2001 | Statnikov | |
| 6,289,736 B1 | | 9/2001 | Statnikov | |
| 6,338,765 B1 | * | 1/2002 | Statnikov | B23K 9/32 116/137 A |
| 6,843,957 B2 | * | 1/2005 | Statnikov | B23K 9/32 266/80 |
| 6,926,970 B2 | * | 8/2005 | James | B23K 20/122 228/112.1 |
| 6,932,876 B1 | | 8/2005 | Statnikov | |
| 6,940,042 B2 | * | 9/2005 | Hara | B23K 35/3053 219/145.22 |
| 6,993,948 B2 | * | 2/2006 | Offer | B23P 9/04 29/90.7 |
| 7,022,938 B2 | * | 4/2006 | Tamura | B23K 26/123 219/121.64 |
| 7,276,824 B2 | | 10/2007 | Statnikov et al. | |
| 7,301,123 B2 | | 11/2007 | Statnikov | |
| 7,344,609 B2 | | 3/2008 | Statnikov | |
| 7,431,779 B2 | | 10/2008 | Statnikov | |
| 7,559,221 B2 | * | 7/2009 | Horita | B21C 23/001 148/558 |
| 7,754,033 B2 | * | 7/2010 | Ishikawa | B23K 20/10 148/558 |
| 8,946,582 B1 | * | 2/2015 | Bong | B23K 9/04 219/73.1 |
| 2004/0181870 A1 | * | 9/2004 | Bohacik | E03C 1/18 4/619 |
| 2005/0145306 A1 | * | 7/2005 | Statnikov | B06B 1/0253 148/508 |

\* cited by examiner

SURFACE CONTOURING OF A WELD CAP AND ADJACENT BASE METAL USING ULTRASONIC IMPACT TREATMENT

FIELD OF THE INVENTION

The present invention is directed to a method for reshaping a weld cap and an adjacent base metal surface, and more particularly, to a method for forming a smooth transition between the weld cap and the adjacent base metal utilizing ultrasonic impact treatment (UIT).

BACKGROUND OF THE INVENTION

Welds are considered to be the weakest point in structures fabricated using welding technologies. This is a result of a number of things coming into play. For example, welds produce poor geometric profiles with respect to fatigue life performance and introduce tensile residual stresses at the same location which are deleterious to metal fatigue life. Furthermore, introducing heat into a base metal during welding can alter the microstructure and properties of a portion of the base metal where the heat is experienced. The area experiencing these alterations is referred to as the heat-affected zone. Heat-affect zone base metal has a weaker relative strength than the base metal and the weld metal.

SUMMARY OF INVENTION

The present invention is directed to a method for forming a smooth interface between a weld metal and an adjacent base metal utilizing UIT thereby improving the geometric profile of a weld seam while imparting a compressive residual stress layer on the weld metal and base metal and alleviating the tensile residual stresses imparted to the metals during welding. The weld metal to base metal interface refers a line defined by the intersection of a lateral edge of the weld metal with the base metal. UIT refers to a process of introducing pulses of ultrasonic wave energy into a metal workpiece through periodic ultrasonic mechanical impulse impacts. UIT is described in detail in U.S. Pat. Nos. 7,431,779; 7,344,609; 7,301,123; 7,276,824; 6,932,876; 6,843,957; 6,289,736, and 6,171,415, which are incorporated herein by reference in their entireties. Generally, UIT serves to plastically deform a metal surface and thus imparting a compressive residual stress layer on the workpiece. Thus, UIT does not remove material, as in grinding, but plastically deforms the surface being treated producing a densified surface, in turn providing a smooth weld cap and base metal surface finish. Thus, the method when used in a post weld environment represents a surface contouring method and an alternate method to surface grinding of weldments.

According to one aspect of the invention, there is provided a method for modifying a weld seam including a weld metal, a base metal and a first weld metal to base metal interface, wherein the weld metal forms a weld cap produced by one or more cap weld passes. The method includes imparting a desired contour to the weld seam by introducing pulses of ultrasonic wave energy into the weld seam through periodic ultrasonic mechanical impulse impacts using a tool including one or more ultrasonically movable impacting elements. The mechanical impulse impacts are made by multiple passes of the tool along the weld seam. Initially, the weld cap is textured by performing a first roughing pass along the weld seam in a first orbital pattern that is centered on a longitudinal axis of the weld seam. Thereafter, the weld cap, base metal and first weld metal to base metal interface are textured by performing a second roughing pass along a length of the weld seam in a second orbital pattern that is centered on the first weld metal to base metal interface. Following the second roughing pass, the weld cap, base metal and a second weld metal to base metal interface that is opposite the first weld metal to base metal interface are textured by performing a third roughing pass along a length of the weld seam in a third orbital pattern that is centered on the second weld metal to base metal interface. Upon completion of the first, second and third roughing passes, the weld seam exhibits a textured or dimpled pattern.

Following texturing of the weld seam, which blends together the weld metal laid down by multiple cap weld pass, the textured surface of the weld seam is smoothed by performing a fourth set of contouring passes along a length of the weld seam. Fourth set of contouring passes includes three separate passes, each of which exhibits an orbital pattern having a progressively increasing diameter. Specifically, the fourth set of contouring passes includes a first orbital patterned pass centered on a longitudinal axis of the weld seam, a second orbital patterned pass centered on the first weld metal to base metal interface and a third orbital patterned pass centered over the second weld metal to base metal interface. Lastly, the surface roughness of the weld cap is further smoothed and contoured by performing a fifth set of contouring passes. Fifth set of contouring passes includes three separate passes, each of which exhibits an orbital pattern. Specifically, The fifth set of contouring passes and the fifth orbital pattern include a first orbital patterned pass centered on a longitudinal axis of the weld seam and extending across the first weld metal to base metal interface and the second weld metal to base metal interface, a second orbital patterned pass centered on the first weld metal to base metal interface that extends over the longitudinal axis of the weld seam, and a third orbital patterned pass centered over the second weld metal to base metal interface and that extends over the longitudinal axis of the weld seam. When the passes are completed, the weld seam exhibits the desired profile, which includes a flat, smooth weld metal to base metal interface.

According to another aspect of the invention, there is provided a method for contouring a weld seam including a weld metal, a base metal and a first weld metal to base metal interface, wherein the weld metal forms a weld cap produced by one or more cap weld passes. The method includes making a plurality of roughing passes along a length of the weld seam whereby the weld seam is imparted with a texture, and making a plurality of contouring passes along the length of the weld seam whereby the texture is removed and the weld seam is provided a substantially smooth surface. The plurality of roughing passes and the plurality of contouring passes are performed by impacting the weld seam with one or more ultrasonically movable impacting elements longitudinally along the weld seam in both directions and in orbital patterns.

The plurality of roughing passes include a first pass along the weld cap which is centered along a longitudinal axis of the weld seam, a second pass along the first weld metal to base metal interface which is centered along the first weld metal to base metal interface and a third pass along a second weld metal to base metal interface opposite the first weld metal to base metal interface, the third pass being centered along the first weld metal to base metal interface. The plurality of contouring passes include a first pass along the weld cap which is centered along a longitudinal axis of the weld seam, a second pass along the first weld metal to base metal interface which is centered along the first weld metal to base metal interface and a third pass along a second weld metal to base metal interface opposite the first weld metal to base metal interface, the third pass being centered along the first weld metal to base metal interface. The plurality of roughing passes are performed using impacting elements having a first diameter and the plurality of contouring passes are performed using impacting elements having a second diameter wherein the second diameter is usually but not restricted to being larger than the first diameter. Preferably, the first diameter is about 2.0-5.0 mm and the second diameter is about 5.5 to 7.5 mm.

According to yet another aspect of the invention, there is provided a workpiece including a weld seam having smooth weld metal to base metal interface constructed and arranged by introducing pulses of ultrasonic wave energy into the weld seam through periodic ultrasonic mechanical impulse impacts.

DETAILED DESCRIPTION OF THE INVENTION

The UIT contouring process provides a weld seam having a smooth weld cap and a smooth weld metal to base metal interface clear of surface irregularities. The process further provides an improved stress profile at the weld metal to base metal interface and it is believed a surface finish suitable for post weld non-destructive inspection methods including dye penetration and ultrasonic processes. This is accomplished by imparting a compressive stress layer to the weld seam having a depth of up to 2.5 mm while plastically deforming the weld cap and base metal surface into the desired weld seam profile. The UIT contouring process can be used on base metal and/or welded structures, including fillet and butt welds, when post weld contour grinding has been specified by a design engineer as a means of improving surface finish and/or applying compressive residual stress to the surface of a welded structure. The UIT weld contouring process is a post weld treatment process that should only be applied when the cap weld is complete, the weld has been inspected and weld is accepted by a certified welding inspector or quality control engineer.

Figure 1:
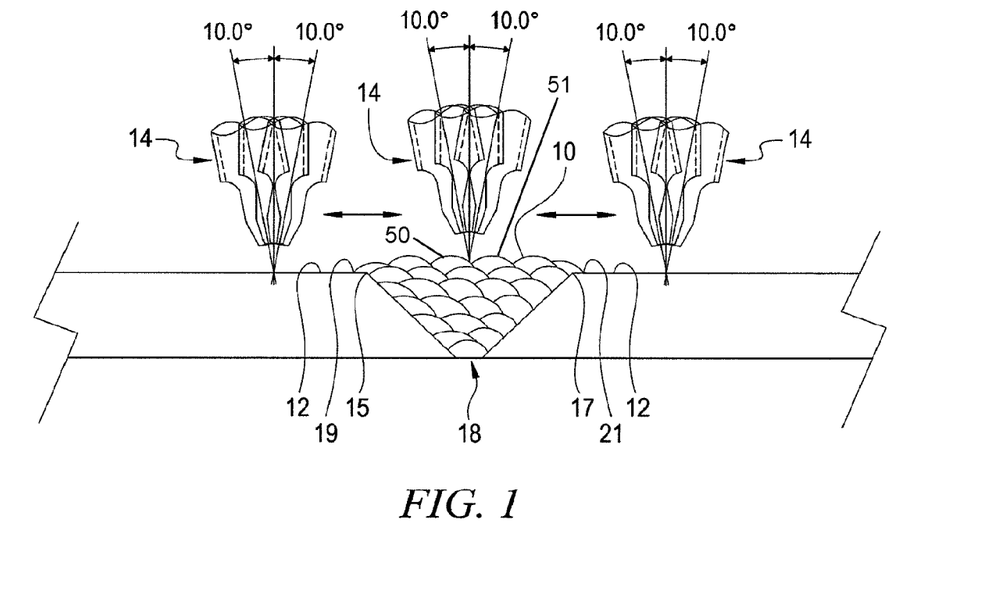
FIG. 1 depicts positioning of UIT tools relative to a weld seam in accordance a preferred embodiment of the invention.

Referring to FIG. 1, the UIT contouring process of the present invention generally includes applying pulse wave energy through ultrasonic impulse impacts to a weld seam 18 by contacting a UIT tool to the center of a weld cap 10 and moving the tool down and across the weld face and on to adjacent base metal 12. The weld cap 10 may be produced by one or more cap weld passes, and the one or more cap weld passes may include a first cap weld pass 50 and a second cap weld pass 51. The ultrasonic impacts act first to blend the metal of weld cap 10 and thereafter to smooth and contour weld cap 10 by plastically deforming weld seam 18 surface for a minimum of one inch from both weld toes 15 and 17 to both weld metal to base metal interfaces 19 and 21. Preferably, the tool is moved across weld seam 18 a minimum of one inch from both weld toes 15, 17 to base metal interfaces.

To impart the requisite pulse wave energy and ultrasonic mechanical impulse impacts to weld seam 18 for obtaining the desired weld seam contouring, an ultrasonic impact operating tool as described in U.S. Pat. No. 6,932,876 can be used. That tool employs a set of ultrasonically movable impacting elements 14, presented typically as sets of two or four spaced members, for impacting weld seam 18 under control of an ultrasonic transducer head. A periodic pulse energy source, typically operable at ultrasonic frequencies up to 100 kHz, induces oscillations into the transducer head, preferably subject to feedback frequency and phase control processing feedback from the working transducer head to aid in matching resonance characteristics of the head when working on weld seam 18 in the manner more particularly set forth herein and in the parent applications of U.S. Pat. No. 6,932,876. Impacting elements 14 create at the work surface and extending into the sub-surface region of weld seam 18 plasticized metal permitting the surface of weld seam 18 to be imparted with a desired profile. UIT further imparts both ultrasonic relaxation and impulse relaxation within weld seam 18. These two components of UIT reduce the magnitude of the tensile residual stresses in weld seam 18 at greater depths than the plasticity induced compressive stresses which are a surface phenomenon.

As described hereafter in more detail, the UIT contouring process is a multipass procedure using a variety of UIT tool power settings and pin geometries to achieve metal blending and a smooth contoured surfaces. For example, UIT tool power setting will vary based upon the desired weld metal to base metal profile, weld conditions and contouring requirements as specified by a structural design engineer. Further, the UIT tool pin geometries will vary depending on whether a tool pass across weld seam 18 is designed to blend metal or contour the metal. Preferably, the UIT tool is equipped with pins having diameters ranging from 3 mm to 9 mm that are arranged in an inline four pin array or single pin configuration.

A description of an exemplary UIT surface contouring process and tool configurations therefore is described hereafter. It should be noted, that weld cap 10 conditions are can vary thereby requiring adjustments to the general UIT tool contouring setup and contouring process to achieve the optimum weld contour and surface finish.

Referring to FIG. 1, when UIT contouring is being performed, the UIT tool is arranged essentially perpendicular to the surface being contoured. To ensure that a proper pin to surface angle is maintained, the pin angle variation from perpendicular should range within +/−10 degrees. As the UIT tool is moved across weld seam 18, the motion of the UIT tool is a pushing motion, not sweeping, in straight or orbital paths running the length of weld seam 18. The orbital paths are linear down the length of weld seam 18 and extend onto base metal 12 using large and small orbital patterns which blend and smooth the weld and base metal surfaces. The treatment speed can vary among operators and is not a critical parameter for the process. The average linear treatment speed ranges between 30 cm per minute and 60 cm per minute. The treatment speed and the number of orbital patterns is determined based on visual inspection of the surface being treated and the smoothness specification of the surface. The critical treatment parameters are weld metal to base metal transition and surface smoothness.

Figure 2:
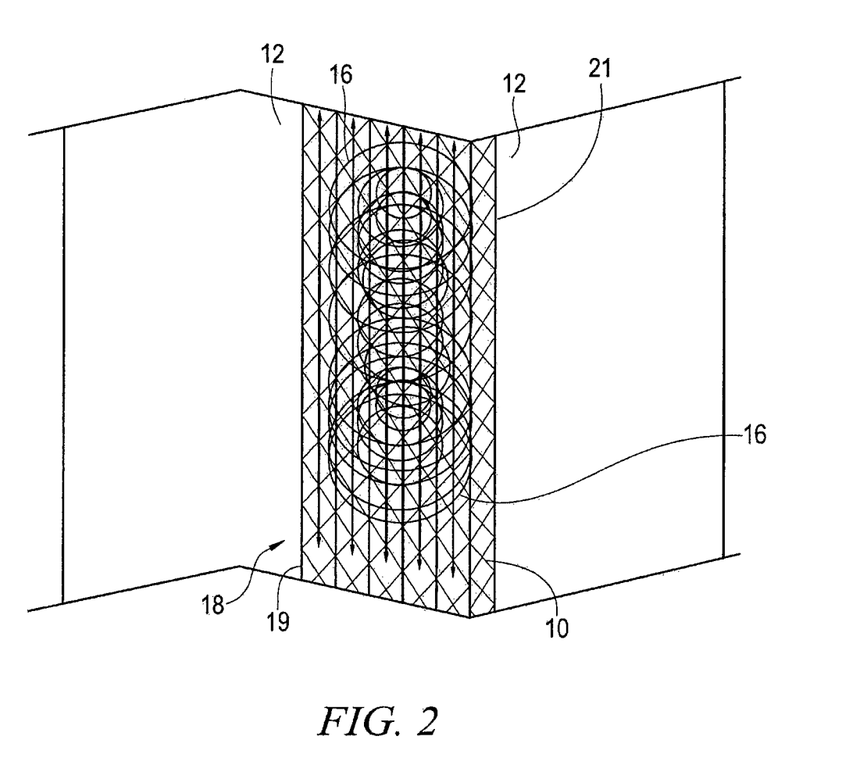
FIG. 2 depicts a first roughing pass along the weld seam of FIG. 1.

Referring to FIG. 2, the UIT surface contouring process begins with a first contouring pass 16 which is classified as a roughing pass since it imparts a texture to weld cap 10. The orbital patterns of first contouring pass 16 are uniform traveling the length of weld seam 18 with increasing radial paths or diameters at intervals for blending the weld metal of weld cap 10. First contouring pass 16 is intended to blend and make uniform the welded surface of weld cap 10 while removing any uneven portions formed between adjacent and overlapping weld cap weld metal passes. First contouring pass 16 is performed using a four, 3 mm diameter, in line pin array. The motion and coverage are shown in FIG. 2 with the UIT tool traveling up and down weld seam 18 and centered along weld cap 10. It is important to note that a contouring pass consists of a series of traveling motions up and down weld cap 10 and base metal 12 surface.

Figure 3:
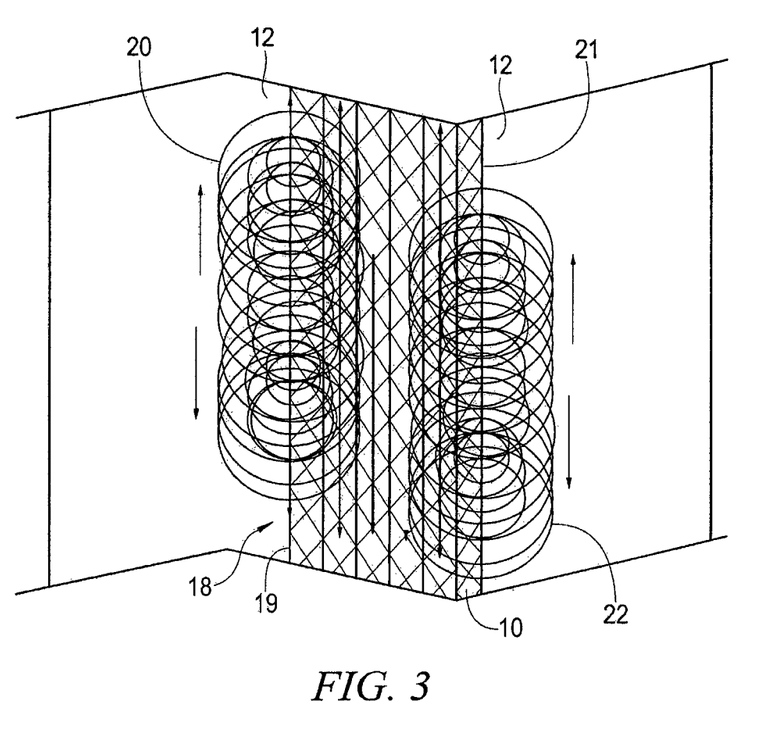
FIG. 3 depicts a second roughing pass and a third roughing pass along the weld seam of FIG. 1.

When weld cap 10 surface is uniform, all uneven surfaces along weld cap 10 are removed and the weld metal of weld cap 10 is blended, first contouring pass 16 is complete. Thereafter, a second contouring pass 20 and a third contouring pass 22 are made, which like first contouring pass 16 are roughing passes. Referring to FIG. 3, second contouring pass 20 starts the blending process of weld cap 10 to base metal 12 along weld metal to base metal interface 19 of weld seam 18. Third contouring pass 22 is made along opposing weld metal to base metal interface 21 of weld seam 18. Second contouring pass 20 and third contouring pass 22 are therefore essentially centered upon weld metal to base metal interfaces 19 and 21, respectively, and are blending passes to the extent they blend the weld metal and base metal along weld metal to base metal interfaces 19 and 20. Second contouring pass 20 and third contouring pass 22 use, though they are not required to use, the same pin configuration used in first contouring pass 16 and therefore both impart a textured or dimpled appearance along and adjacent to weld metal to base metal interfaces 19 and 21. The UIT tool motion and pattern are the same motion and pattern carried out during first contouring pass 16. That is, the UIT tool is moved linearly in an orbital motion but with the tool positioned at the weld toe interface to base metal 12. Thus, the motion and position of the UIT tool work in an orbital motion from weld cap 10 to base metal 12. Second and third contouring passes 20 and 22 are carried out until both base metal 12 and weld cap 10 have been effectively impacted and blended.

During second and third contouring passes 20 and 22, the weld cap 10 surface, base metal 12 and weld metal to base metal interfaces 19 and 21 interfaces should be periodically visually inspected to ensure complete treatment and blending has been achieved. If visible lines are present during the inspection insufficient blending has occurred. If this condition is present, additional blending via continued second and third contouring passes 20 and 22 are required in those areas using the four pin, 3 mm array. When performing the visual inspection after second contouring pass 20 and third contouring pass 22, the surface of weld cap 10 and base metal 12 should be rough or textured having a dimpled surface appearance without visible linearly extending lines. If a linear condition is present additional treatment/blending is required.

Figure 4:
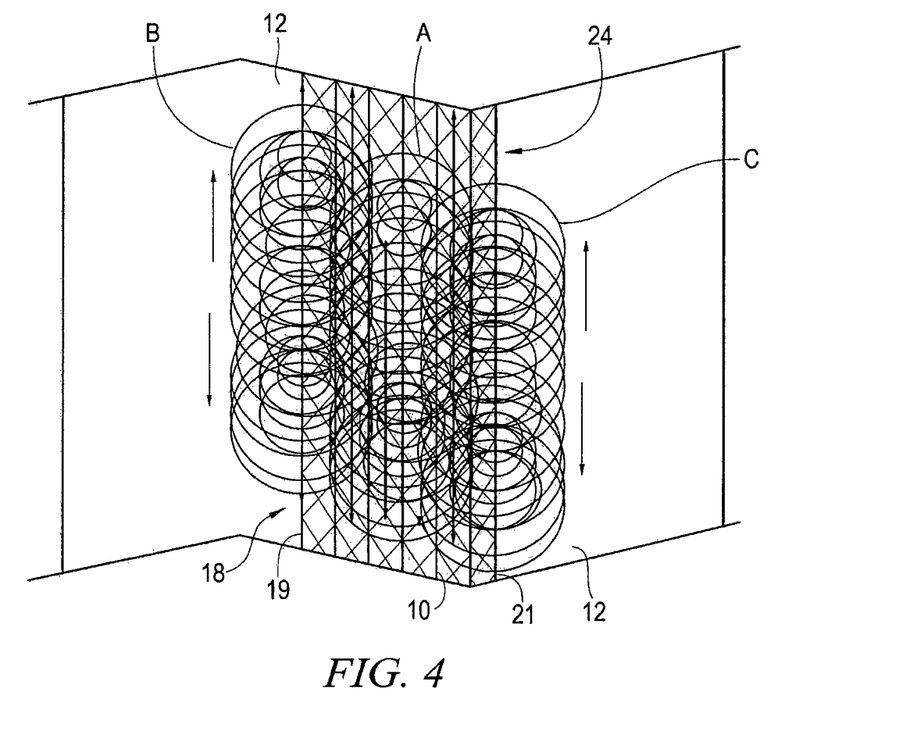
FIG. 4 depicts a set of fourth contouring passes along the weld seam of FIG. 1.

When second contouring pass 20 and third contouring pass 22 are complete, a fourth set of contouring passes 24 are performed. Fourth set of contouring passes 24 are contouring passes meaning they are intended to smooth and impart a desired profile to weld seam 18. Referring to FIG. 4, fourth contouring passes 24 consist of several passes with the UIT tool positioned on weld cap 10 and base metal 12 to achieve the specified surface finish and contoured condition. Those passes include a pass A centered along weld cap 10, a pass B centered along weld metal to base metal interface 19 and a pass C centered along weld metal to base metal interface 21.

Fourth set of contouring passes 24 use a pin configuration based on surface finish requirements which are different from the pin configuration used in the first, second and third contouring passes. In the field, the desired pin geometry and array for fourth set of contouring passes 24 are specified in the work instruction for the specific job based on surface finish requirements. Typically, fewer pins with larger diameters are utilized during the fourth set of contouring passes that are in the first, second and third contouring passes. In this example, the pin array includes a two pin inline array using ¼" diameter pins with a face radius of six inches. The UIT tool with the 2 pin inline array is worked similarly to the previous passes, moving in a linear fashion up and down weld seam 18 in an orbital pattern. As weld cap 10 and base metal 12 contouring is achieved the orbital patterns and diameter of the radial path increase in size in order to create a uniform and contoured surface.

FIG. 4 depicts the initial treatment pattern for blending the roughing passes, namely, first contouring pass 16, second contouring pass 20 and third contouring pass 22. The orbital patterns used in fourth set of contouring passes 24 start with small orbital patterns that increase in diameter as full blending is achieved. When weld cap 10 and base metal 12 surfaces have been blended and the textured surface is no longer visible, fourth set of contouring passes is complete, and a fifth set of contouring passes 26 is applied. Fifth set of contouring passes 26 are the final contouring passes. Fifth set of contouring passes 26 may require a new pin configuration relative to the pin configuration of the fifth set of contouring passes 26 depending on the surface finish requirements specified in the job specification.

Figure 5:
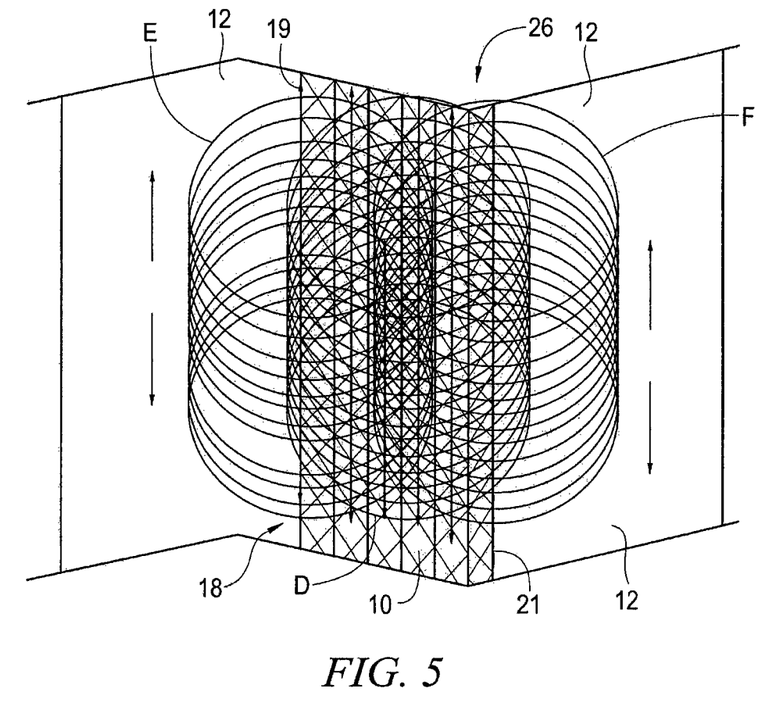
FIG. 5 depicts a set of fifth contouring passed along the weld seam of FIG. 1.

Referring to FIG. 5, fifth set of contouring passes 26 consist of several passes with the UIT tool positioned on weld cap 10 and base metal 12 to achieve the specified surface finish and contoured condition. Those passes include a pass D centered along weld cap 10, a pass E centered along weld metal to base metal interface 19 and a pass F centered along weld metal to base metal interface 19. Fifth set of contouring passes 26 do not include a true linear pattern but rather rely upon a motion focused on blending and contouring weld metal 10 surfaces. During fifth set of contouring passes 26, the orbital patterns progressively increase in diameter with large sweeping patterns focused at contouring so that weld metal 10 and base metal 12 surfaces appear as one surface with all transitions being eliminated. The large sweeping orbital motion is intended to provide surface condition treatment such that all rough or textured surfaces are minimized and weld metal 10 and base metal 12 form a smooth, featureless transition along weld metal to base metal interfaces 19 and 21.

Following fifth set of contouring passes 26, weld metal 10 and base metal 12 surfaces along weld metal to base metal interfaces 19 and 21 are smooth in appearance and to the touch. Thus, the transition between the weld metal and base metal 12 surfaces along interfaces 19 and 20 is smooth so that the transition does not present two uneven surfaces where one surface extends vertically below or above the other surface.

To determine whether fifth set of contouring passes 26 is complete, weld seam 18 is inspected by wiping the complete weld metal 10 and base metal 12 surface along weld seam 18 with a clean dry 100% nylon cloth, or equivalent. If weld metal 10 and base metal 12 surfaces have any irregular conditions, the nylon cloth is picked by the surface as the wiping occurs. If the nylon cloth is not picked by the surface, each of these areas is then inspected with an 8× magnification glass. If the 8× magnification inspection reveals a sharp or jagged surface condition, further smoothing, contouring passes are required. If no irregular surface conditions are detected, the UIT surface contouring process is complete.

Figure 6:
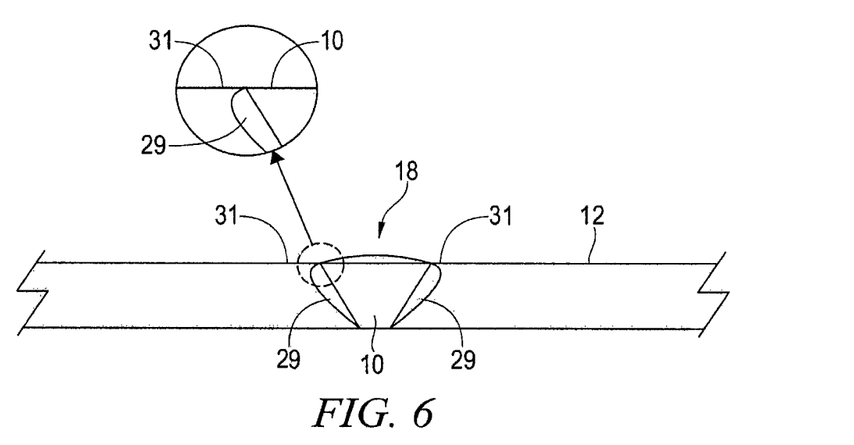
FIG. 6 depicts a desired weld seam profile created utilizing a method in accordance with a preferred embodiment of the present invention.

Upon completion of the UIT surface contouring process, weld seam 18 displays a smooth weld cap 10 surface and smooth weld metal to base metal interfaces 19 and 20. Referring to FIG. 6, to provide smooth weld metal to base metal interfaces 19 and 20, the weld metal of weld cap weld 10 is across and over base metal 12 to form a thin layer 31 of weld metal over base metal 12 and across heat affected zones 29. Weld metal layer 31 is as thin 1/64 inch and tapers against base metal 12 to a provide a 180 degree joint there between thereby providing weld metal to base metal interfaces 19 and 20 a smooth or flat profile.

Figure 7:
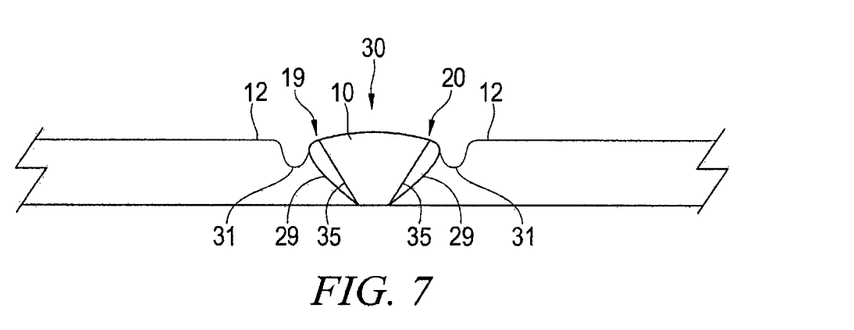
FIG. 7 depicts an alternative weld seam profile created utilizing a method in accordance with a preferred embodiment of the present invention.
Figure 8:
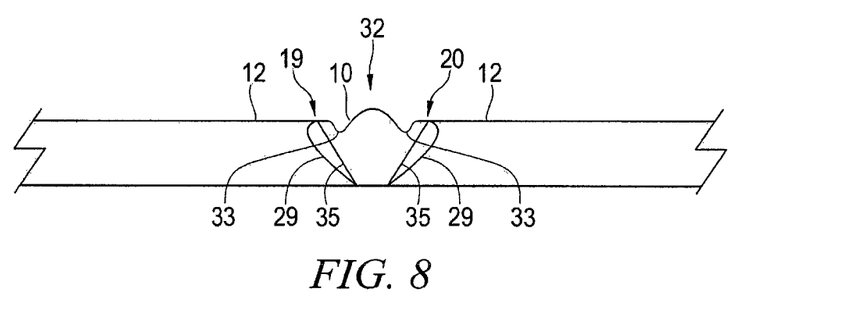
FIG. 8 depicts yet another alternative weld seam profile created utilizing a method in accordance with a preferred embodiment of the present invention.

Referring to FIGS. 7 and 8, there are depicted alternative weld seam profiles that can be accomplished using the present UIT surface contouring process. These weld seam profiles are presented to show that the desired smooth and flat weld metal to base metal interfaces forming a 180 degree or flat juncture between the weld metal and base metal 12 do not have to be coincident with cap weld or the base metal. For example, FIG. 7 illustrates a weld seam 32 including bi-lateral grooves 31 formed in the weld metal of weld cap 10 that extend along a length of weld seam 30 adjacent to heat affected zones 29 and weld metal to base metal interfaces 19 and 20. Grooves 31 can be created using a UIT tool by moving the tool up and down weld seam 30 in a straight line adjacent to heat affected zones 29 and weld metal to base metal interfaces 19 and 20. As shown, the UIT treated surfaces of weld metal to base metal interfaces 19 and 20 are smooth and flat and each form a 180 degree joint there between. Fusion lines 35 between the weld metal and base metal 12 intersect weld metal to base metal interfaces 19 and 20 as essentially 90 degree angles. However, the weld metal to base metal interfaces 19 and 20 are not coincident with base metal 12 by virtue of groove. Similarly, FIG. 8 illustrates a weld seam 32 including bi-lateral grooves 33 formed in base metal 12 that extend along a length of weld seam 32 adjacent to heat affected zones 29 and weld metal to base metal interfaces 19 and 20. In this embodiment, UIT treated surfaces of weld metal to base metal interfaces 19 and 20 are also smooth and flat and form a 180 degree joint there between. Also, fusion lines 35 between the weld metal and base metal 12 intersect weld metal to base metal interfaces 19 and 20 as essentially 90 degree angles. However, the weld metal to base metal interfaces 19 and 20 are not coincident with grooves 33 by virtue of groove.

As will be apparent to one skilled in the art, various modifications can be made within the scope of the aforesaid description. Such modifications being within the ability of one skilled in the art form a part of the present invention and are embraced by the claims below.

It is claimed:

1. A method for modifying a weld seam, the weld seam including a weld metal, a base metal, and a first weld metal to base metal interface, wherein the weld metal forms a weld cap produced by one or more cap weld passes, the method comprising:
    imparting a contour to the weld seam by introducing pulses of ultrasonic wave energy into the weld seam through periodic ultrasonic mechanical impulse impacts,
    wherein the periodic ultrasonic mechanical impulse impacts are introduced to the weld seam by a tool including one or more ultrasonically movable impacting elements, and
    wherein the imparting the contour to the weld seam includes performing a first pass along the weld seam, whereby the one or more ultrasonically movable impacting elements are applied to the weld metal and moved along a length of the weld seam in a first orbital pattern.

2. The method according to claim 1 wherein the first pass is a first roughing pass that imparts a texture to the weld cap.

3. The method according to claim 2 wherein the first orbital pattern is essentially centered along a longitudinal axis of the weld seam.

4. The method according to claim 2 further comprising texturing the weld cap and the first weld metal to base metal interface by performing a second roughing pass, whereby the one or more ultrasonically movable impacting elements are applied to the weld metal, the base metal, and the first weld metal to base metal interface, and moved along a length of the weld seam in a second orbital pattern.

5. The method according to claim 4 wherein the second orbital pattern is essentially centered along the first weld metal to base metal interface.

6. The method according to claim 4 wherein the second orbital pattern does not extend completely across the weld cap.

7. The method according to claim 4 further comprising, following the second roughing pass, visually inspecting the weld seam for longitudinally extending lines about the first weld metal to base metal interface, which are indicative of insufficient smoothing of the first weld metal to base metal interface, and if the longitudinally extending lines are visible, repeating the second roughing pass.

8. The method according to claim 4 further comprising texturing the weld cap and a second weld metal to base metal interface that is opposite the first weld metal to base metal interface by performing a third roughing pass whereby the one or more ultrasonically movable impacting elements are applied to the weld metal, the base metal and the second weld metal to base metal interface and moved along a length of the weld seam in a third orbital pattern.

9. The method according to claim 8 wherein following the first roughing pass, the second roughing pass, and the third roughing pass, the weld seam exhibits a dimpled pattern.

10. The method according to claim 8 wherein the first roughing pass blends the weld metal of a first cap weld pass with the weld metal of a second cap weld pass, and the second roughing pass and the third roughing pass blend the weld metal with the base metal.

11. The method according to claim 8 further comprising decreasing a surface roughness of the weld cap, the first weld metal to base metal interface, and the second weld metal to base metal interface by performing a fourth set of contouring passes, whereby the one or more ultrasonically movable impacting elements are applied to the weld metal, the base metal, the first weld metal to base metal interface, and the second weld metal to base metal interface and moved along a length of the weld seam.

12. The method according to claim 11 wherein the fourth set of contouring passes include a first orbital patterned pass essentially centered on a longitudinal axis of the weld seam, a second orbital patterned pass essentially centered on the first weld metal to base metal interface, and a third orbital patterned pass essentially centered over the second weld metal to base metal interface.

13. The method according to claim 12 wherein the first orbital patterned pass does not extend across the first weld metal to base metal interface or the second weld metal to base metal interface, the a second orbital patterned pass does not extend over the longitudinal axis of the weld seam, and the third orbital patterned pass does not extend over the longitudinal axis of the weld seam.

14. The method according to claim 11 wherein the fourth set of contouring passes smoothes a dimpled pattern in the weld seam.

15. The method according to claim 11 wherein movable impacting elements of the one or more ultrasonically movable impacting elements used for performing the fourth set of contouring passes have larger diameters than movable impacting elements of the one or more ultrasonically movable impacting elements used for performing the first roughing pass, the second roughing pass, and the fourth roughing pass.

16. The method according to claim 11 further comprising decreasing a surface roughness of the weld cap, the first weld metal to base metal interface, and the second weld metal to base metal interface by performing a fifth set of contouring passes, whereby the one or more ultrasonically movable impacting elements are applied to the weld metal, the base metal, the first weld metal to base metal interface, and the second weld metal to base metal interface and moved along a length of the weld seam, the fifth set of contouring passes including a fourth orbital patterned pass essentially centered on a longitudinal axis of the weld seam and extending across the first weld metal to base metal interface and the second weld metal to base metal interface, a fifth orbital patterned pass essentially centered on the first weld metal to base metal interface that extends over the longitudinal axis of the weld seam, and a sixth orbital patterned pass essentially centered over the second weld metal to base metal interface and that extends over the longitudinal axis of the weld seam.

17. The method according to claim 1 wherein the contour includes a smooth first weld metal to base metal interface surface.

18. The method according to claim 1 wherein the contour includes a smooth weld cap.

19. The method according to claim 1 wherein the contour includes a flat first weld metal to base metal interface surface.

* * * * *